United States Patent
Gabrys (10) Patent No.: US 7,750,515 B1
(45) Date of Patent: Jul. 6, 2010

(54) INDUSTRIAL AIR CORE MOTOR-GENERATOR

(76) Inventor: Christopher W. Gabrys, 1001 S. Meadows Pkwy., #1126, Reno, NV (US) 89521

(*) Notice: Subject to any disclaimer, the term of this patent is extended or adjusted under 35 U.S.C. 154(b) by 479 days.

(21) Appl. No.: 11/583,476

(22) Filed: Oct. 19, 2006

Related U.S. Application Data (60) Provisional application No. 60/730,201, filed on Oct. 25, 2005.

(51) Int. Cl.
*H02K 9/06* (2006.01)

(52) U.S. Cl. .................... 310/61; 310/266; 310/268

(58) Field of Classification Search .......... 310/58, 310/29, 61–64, 265, 266, 268, 179, 208
See application file for complete search history.

(56) References Cited

U.S. PATENT DOCUMENTS

| | | | | |
|---|---|---|---|---|
| 3,916,231 A | * | 10/1975 | Cathey | 310/62 |
| 4,465,946 A | * | 8/1984 | Springer | 310/42 |
| 4,634,912 A | * | 1/1987 | Heyraud | 310/268 |
| 5,004,944 A | * | 4/1991 | Fisher | 310/266 |
| 5,331,244 A | | 7/1994 | Rabe | 310/180 |
| 5,510,664 A | * | 4/1996 | Suzuki et al. | 310/268 |
| 5,630,461 A | * | 5/1997 | CoChimin | 164/34 |
| 5,698,913 A | * | 12/1997 | Yagi et al. | 310/58 |
| 5,731,645 A | * | 3/1998 | Clifton et al. | 310/74 |
| 5,744,896 A | | 4/1998 | Kessinger, Jr. | 310/268 |
| 5,789,833 A | * | 8/1998 | Kinoshita et al. | 310/64 |
| 5,877,576 A | * | 3/1999 | CoChimin | 310/254 |
| 5,880,544 A | * | 3/1999 | Ikeda et al. | 310/74 |
| 5,892,307 A | * | 4/1999 | Pavlovich et al. | 310/68 B |
| 5,945,766 A | * | 8/1999 | Kim et al. | 310/268 |
| 5,962,942 A | * | 10/1999 | Pullen et al. | 310/156.37 |
| 5,982,074 A | * | 11/1999 | Smith et al. | 310/261 |
| 6,424,069 B1 | | 7/2002 | Pullen et al. | 310/156 |
| 6,720,688 B1 | * | 4/2004 | Schiller | 310/64 |
| 6,750,588 B1 | * | 6/2004 | Gabrys | 310/268 |
| 6,891,290 B2 | | 5/2005 | Nagayama | 310/58 |
| 6,914,354 B2 | | 7/2005 | Seniawski | 310/58 |
| 6,927,509 B2 | | 8/2005 | Cichetti, Sr. | 310/52 |

FOREIGN PATENT DOCUMENTS

JP          62274535 A    * 11/1987

* cited by examiner

*Primary Examiner*—Tran N Nguyen
(74) *Attorney, Agent, or Firm*—J. Michael Neary (57) ABSTRACT

A non-ventilated motor-generator includes a rotor supported for rotation on bearings inside a closed metal housing. The rotor is constructed of two spaced apart rotor sections having permanent magnets that drive magnetic flux across an air gap between the rotor sections. An air core armature in the air gap has windings in a non-magnetic structure that is structurally coupled to the housing. The armature is thinner than the armature air gap and is positioned such that there is a physical air gap on each side of the armature. The rotor has air flow passages through which air is induced to flow, in operation, in a polloidal loop that includes a portion that passes through the armature air gap, picking up heat from the armature, and a portion that is in contact with the inside of the motor-generator housing where the heat is transferred to the housing and dissipated to the atmosphere.

20 Claims, 5 Drawing Sheets

INDUSTRIAL AIR CORE MOTOR-GENERATOR

This is related to U.S. Provisional Application No. 60/730,201 entitled "Industrial Air Core Motor-Generator" and filed on Oct. 25, 2005.

This invention pertains to electrical machines for converting between electrical and mechanical energy, and more particularly to an air core motor-generator that is compatible for installation in hazardous locations and also allows for high duty cycle capability with high efficiency.

BACKGROUND OF THE INVENTION

Electric motors consume more than half of all electrical energy used in most countries. Currently, the majority of all motors used are induction motors. Induction motors provide simple and reliable operation and have relatively low manufacturing cost. Unfortunately, induction motors do not provide the highest efficiency.

Some applications of motors and generators run continuously or near continuously. In such applications, the annual electricity consumption costs can be several times greater than the acquisition cost of the motor. Increasing the efficiency of motors used for these applications could provide significant economic benefit.

Another type of motor that can provide higher efficiency than induction motors is the brushless permanent magnet motor. Because the field flux in permanent magnet motors is produced by magnets instead of electrically excited windings as in induction motors, they can operate more efficiently. Unfortunately, conventional brushless permanent magnet motors are more expensive than induction motors. They also do not always provide a great enough increase in efficiency and energy savings to justify the increased cost and make them an economically viable alternative, except where the functional benefits of brushless permanent magnet motor necessitate their use.

One way to increase the efficiency of brushless permanent magnet motors is to eliminate eddy current and hysteresis losses occurring in laminations by eliminating the use of electrical laminations in construction. In such motors, the armature comprises windings with an air core instead of being wound into slots in the laminations. This type of construction also provides the benefits of reduced winding inductance for higher speed operation. As such, these types of motors are small and typically used in cameras, dental drills, flywheel energy storage systems and specialized application servomotors. Despite their potential for increased efficiency, air core brushless motors have heat generation that is difficult to remove without incurring significant additional losses or substantial costs. The heat generation, if not effectively removed, can limit the duty cycle of the motor through over heating. Accordingly, a brushless air core permanent magnet motor with low loss cooling is desired.

SUMMARY OF THE INVENTION

The invention provides a high efficiency motor-generator that can be operated with a high duty cycle in hazardous installations. In conventional motors, the windings are wound into slots into the stack of stator laminations, and they can be ventilated or totally enclosed. For conventional motors, ventilated construction requires flow-through cooling with the flowing outside air through the inside of the housing to provide cooling. These motors have lower costs but they are not suitable for many applications, including hazardous, exposed, corrosive, dusty or other areas where sealed construction is required. For conventional totally enclosed motors, the heat of the windings is conducted directly away through the direct contact of the windings with the stator steel. The windings can include higher temperature insulation, and the steel stator is a good conductor of this heat to the outside of the enclosure. No outside air is thereby allowed to penetrate the motor housing, allowing installation and operation in any environment.

To provide the highest efficiency, motors can employ air core construction wherein the windings are located in a magnetic airgap and no slot-induced magnetic losses are incurred. Of the configurations for air core motors, the highest efficiency utilizes a double rotating construction wherein no stator laminations are required and no circumferentially varying magnetic flux is caused to pass through stationary steel. In this construction, the armature is comprised of windings in a nonmagnetic structure that is located within a magnetic air gap bounded on both sides by rotating surfaces of the rotor. Although this construction can minimize the motor losses, it also inadvertently provides the worst heat transfer from the windings. Ventilating the motor housing could be done to cool the armature windings, however this would make the motor less suitable for many widespread applications requiring totally enclosed construction.

One additional method that has been proposed for cooling air core armatures in motors is the use thermally conductive epoxy or potting for the windings wherein the potting transfers the windings heat to the housing by direct thermal conduction. Although very simple in concept, we have found that this method of cooling is insufficient. Thermally conductive potting is really not very conductive and is several orders of magnitude less than the conduction through contact with a steel stator in a conventional motor. Thermally conductive polymers are also expensive. The armature must be substantially non electrically conductive and non-magnetic to prevent incurring additional magnetically induced losses from the rotating magnetic flux. Further, the duty cycle of the motor can become limited as the armature temperature continues to rise during operation because of the insufficient heat transfer. Although the motor can be substantially more efficient, the heat transfer from the windings is reduced by an even greater amount.

I have found that the heat removal from the armature can be achieved effectively while still maintaining a totally enclosed housing construction for widespread motor application. The motor-generator is a non-ventilated motor-generator for converting between electrical and rotary mechanical energy. The motor-generator comprises a rotor that is supported on a bearing system to rotate about an axis of rotation inside an enclosed metal motor-generator housing. The rotor is constructed of two spaced apart rotor sections with circumferential arrays of permanent magnets that drive magnetic flux back and forth across an armature air gap formed between the rotor sections. An air core armature is located in the armature air gap and is constructed of multiple phase windings that are held together in a substantially non-magnetic structure that is structurally coupled to the motor housing. The air core armature has a thickness that is less than the armature air gap and the air core armature is located within the armature air gap such that two physical air gaps are created, with one on each side of the air core armature. The rotor further comprises one or more air flow passages in the rotor portions and operation of the motor-generator causes air to flow through the passages and in a polloidal loop within the inside of the motor-generator housing. Air flow in the polloidal loop includes a portion that passes through the armature air gap and a portion that is in contact with the inside of the motor-generator housing. In this way, the air flow removes heat energy from the air core armature and transfers the heat energy to the inside of the motor-generator housing, wherein the heat energy is dissipated from said motor-generator housing. Surprisingly, we have found that polloidal air flow cooling without external ventilation or high thermal conductivity between windings and housing can be substantially effective and can enable continuous operation without excessive winding operating temperatures.

Because of the unique topology, polloidal flow is enabled without requiring outside air to enter the motor housing. Effective cooling is provided so that the high efficiency motor is also simultaneously capable of continuous duty operation in any location. Further, the motor cooling is low cost and does not require expensive thermally conductive polymers for the armature structure to conduct heat to the housing.

In a further embodiment, cooling can be enhanced by the use of two polloidal air flow loops inside the motor-generator housing. It is possible to use passages in both spaced apart rotor portions and flow on both sides of the air core armature to facilitate two polloidal air flow paths. In most cases, this construction is preferred because it maximizes the air flow area over the armature for maximum heat pick up and also maximizes the air flow area over the inside of the housing for maximum heat transfer to the housing.

Air flow inside the motor-generator housing can be created by several different means. The easiest method for implementation is to establish the polloidal loop air flow by an impeller coupled with the rotor such that rotation of the rotor causes air to flow in the polloidal loop. For motors that may be operated in two directions, two sets of impellers can coupled to the rotor such that sufficient air flow cooling of the air core armature is established by rotation of the rotor in either rotational direction.

For increased cooling efficiency, heat absorbing appendages can be attached to the inside of the motor-generator housing to increase the heat removal from the air flow. Likewise, heat dissipating appendages can also be attached to the outside of the motor-generator housing to increase the heat dissipation from the motor-generator housing. In most cases, heat dissipation elements or fins are not required on the outside of the container because the amount of heat energy to dissipate to the surrounding air is quite small, resulting from the high efficiency of the air core motor construction in conjunction with the significant surface area of the motor housing.

To provide the greatest efficiency and minimize the amount of heat energy required for removal from the armature, it is desirable to reduce the losses in the air core armature. These losses are caused by the resistive losses and also eddy current losses as the rotating magnetic flux passes transversely through the armature winding conductors. The resistive losses are minimized by increasing the cross-sectional area of the windings to the extent possible for the motor armature air gap. There is only so much room allotted in a particular motor for the windings. However, the eddy current losses can be mitigated by the windings construction.

In a preferred construction, the effectiveness of the motor cooling is further enhanced by reducing the eddy current heat generation from the air core armature. Less heat energy is thereby required to be transferred through the polloidal air flow from the armature to the housing. The windings are preferably wound with conductors having a smaller cross-sectional area. The eddy current losses for a conductor are proportional to the square of the conductor thickness. To maintain the low resistive losses at the same time the windings wire is therefore constructed from bundled multiple individually insulated strands that are electrically insulated from each other along their length in the armature air gap but are electrically connected in parallel. Armature construction with stranded conductors can be facilitated by using plastic armature forms wherein the forms have features for holding the windings in shape to form the correct windings patterns for efficient motor torque generation.

The motor-generator can be used in both radial and axial gap configurations. Each configuration provides specific advantages and drawbacks depending on the applications. In radial gap configurations, the permanent magnets utilize radial magnetizations and the air flow through the armature air gap is in the axial direction. In axial gap configurations, the permanent magnets utilize axial magnetizations and the air flow through the armature air gap is in the radial direction.

DESCRIPTION OF THE DRAWINGS

The invention and its many attendant features and benefits will become better understood upon reading the following detailed description of the preferred embodiments in conjunction with the drawings, wherein.

DESCRIPTION OF THE PREFERRED EMBODIMENTS

Figure 1:
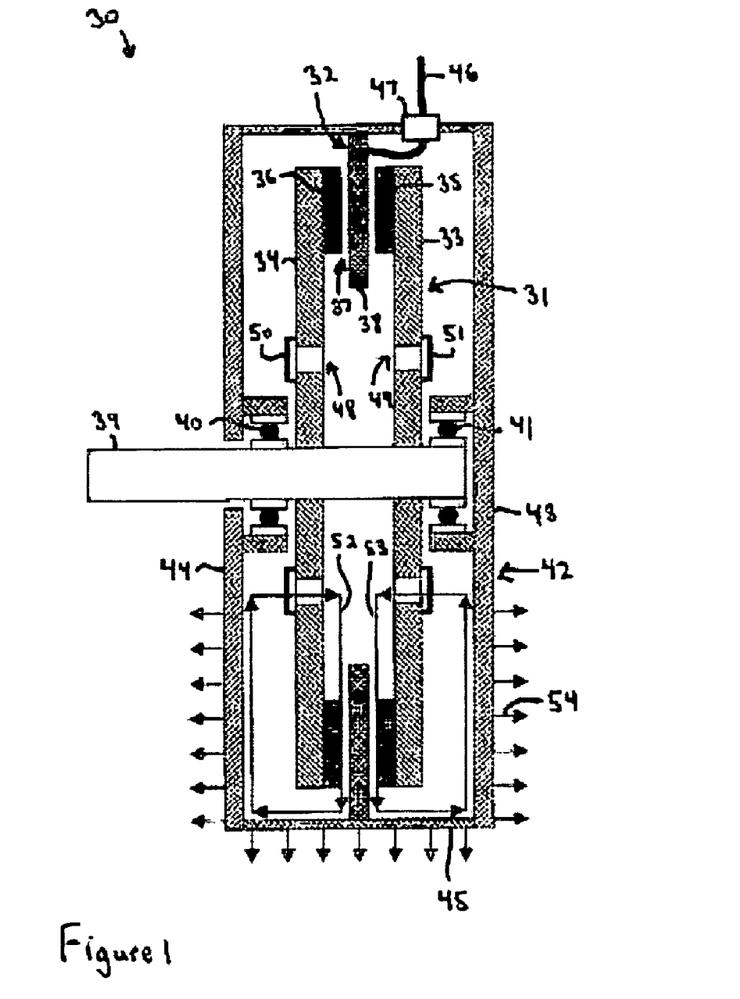
FIG. 1 is a schematic drawing of brushless permanent magnet air core motor-generator in accordance with the invention.

Turning to the drawings, wherein like reference characters designate identical or corresponding parts, a brushless permanent magnet air core motor-generator 30 is shown in FIG. 1. The motor-generator of this invention is a device for converting between electrical and rotary mechanical power. It can be operated as either a motor by applying electric power and producing torque, or alternatively as a generator by applying toque and producing electric power. For simplicity of description, the motor-generator will be described as a motor, although it should be understood that the same structure can also be used as a generator.

The motor-generator 30 is comprised of a rotor 31 and a stator 32. The rotor is constructed of two spaced apart rotor sections 33, 34 that have circumferential arrays of permanent magnets 35, 36. The magnets 35, 36 drive magnetic flux back and forth across an armature air gap 37 formed between the two rotor sections 33, 34. Located within the armature air gap 37 is an air core armature 38. The air core armature is constructed from multiple phase windings that are held together in a substantially non-magnetic structure such that it precludes development of large eddy current and hysteresis losses as the rotating flux from that rotor 31 passes through the air core armature 38. Multiple phase windings are usually preferred for industrial applications because single phase motors would normally need heavier rotor back irons to conduct the flux, and would incur larger end turn losses, however, this invention could be used in single phase motors where they are used because of the unavailability of three-phase power or for other reasons. One type of single phase motor that would especially benefit from use of this invention would be a line synchronous motor, such as that shown in my pending U.S. patent application Ser. No. 11/334,860 entitled "Line Synchronous Air Core Motor", filed on Jan. 18, 2006.

The rotor 31 is supported by a shaft 39 that is journalled by bearings 40, 41 mounted in the motor-generator housing 42. The motor-generator housing 42 is constructed from metal for a high thermal conductivity and comprises end plates 43, 44 and an outer diameter section 45. The housing 42 is non-ventilated. Ventilated motors have air holes and a fan to pull outside air through the ventilation holes for convection cooling of the motor windings cooling with outside air. Non-ventilated motors have no ventilation holes and therefore lack the flow of cooling air circulated from the outside over the motor windings. Because the air core armature 38 is preferably constructed from non-magnetic, electrically non-conductive material (such as plastics), it can have a very poor thermal conductivity and does not effectively conduct heat away. Putting a large metal structure in contact with the windings for thermal conduction would significantly reduce the efficiency through magnetic losses that would be generated in the structure. Therefore, the motor-generator of this invention provides cooling of the motor armature windings without the need for circulation of cooling air into the housing from the exterior of the housing.

To provide cooling to the air core armature without allowing contamination of the inside of the motor by introducing outside cooling air and without incurring substantial magnetic induced losses, air is induced to flow in a closed polloidal loop within the inside of the motor-generator housing. Air flow inducers are provided that operate to induce the flow of air when the rotor 31 rotates. One type of air flow inducer is impellers or scoops 50, 51 on the rotor sections 33, 34 that force air flow through cooling holes 48, 49 on the rotor sections 33, 34 as the rotor 31 rotates. The result is that two polloidal air flow loops 52, 53 are established inside the motor-generator 30. The polloidal loops 52 and 53 are illustrated in FIG. 1 only on the lower part of the cross-section for clarity of illustration, but of course they also exist on the upper part also since these are cylindrical structures. The polloidal air flow loops 52, 53 remove heat from the air core armature without incurring magnetically induced losses. The heat energy is carried by the air flow and transferred on the outside legs of the polloidal loops to the metal container 42 as the polloidal loops 52, 53 are in contact with the inside of the housing 42. Heat energy is conducted through the housing 42 and removed from the outside of the motor-generator 30 as heat dissipation 54.

The motor-generator housing 42 is made of thermally conductive metal, such as steel or aluminum, for strength, durability, thermal conductivity and economy. However, it is contemplated that, for some applications, a non-metallic housing 42 may be desirable. In this case, the non-metallic housing could be made of thermally conductive material, or thermally conductive inserts or appendages, similar to the appendages shown in FIG. 5, could be built into the housing to facilitate conduction of heat from the polloidal air flow along the inside surface of the housing through to the outside of the housing for dissipation to the atmosphere.

Figure 2:
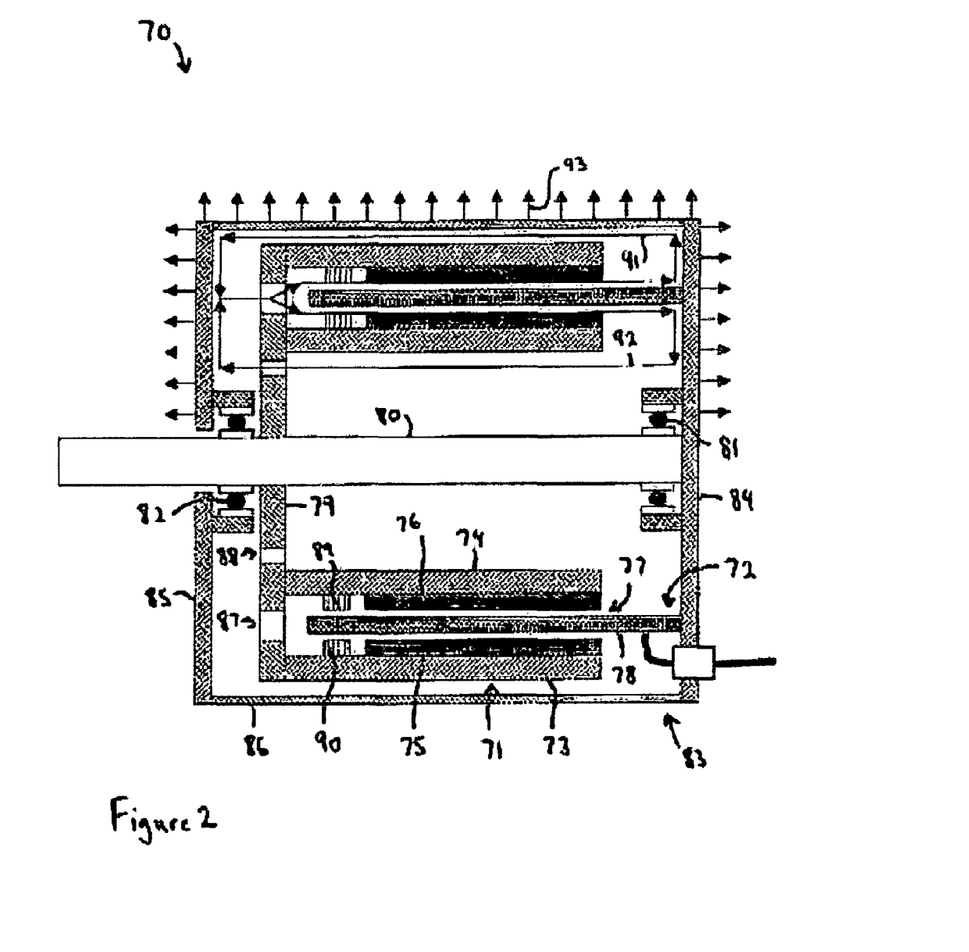
FIG. 2 is a schematic drawing of an alternate configuration of a brushless permanent magnet air core motor-generator in accordance with the invention.

An alternate configuration of a brushless permanent magnet air core motor-generator 70, shown in FIG. 2, includes a rotor 71 and stator 72. The rotor 71 is constructed form two spaced apart rotor tubes 73, 74, which each have circumferential arrays of permanent magnets 75, 76. The magnets 75, 76 drive magnetic flux radially back and forth across an armature air gap 77 formed between the tubes 73, 74. Located in the armature air gap 77 is a cylindrical air core armature 78 with windings in a substantially non-magnetic structure. The rotor tubes 73, 74 are connected to a center shaft 80 by an end hub 79. The shaft 80 is journalled for rotation by bearings 81, 82 that are affixed to a motor-generator housing 83. The housing 83 is constructed from metal for a high thermal conductivity. The housing 83 comprises end plates 84, 85 connected to the ends of an outer tube 86. The rotor 71 includes air passages 87, 88 that allow air flow through the inside of the motor-generator 70. Impellers attached to the shaft 80 or to the rotor, such as impellers 89, 90, attached to the rotor 71, drive air flow in polloidal loops 91, 92 that cool the air core armature. The polloidal loops 91 and 92 are illustrated in FIG. 2 only on the upper part of the cross-section for clarity of illustration, but of course they also exist on the lower part also. The impellers 89, 90 can use various constructions so long as they preferably cause efficient polloidal air flow while adding minimal aerodynamic drag to the rotation of the rotor 71. As shown, the impellers 89, 90 are formed or a spiral screw coil that drives the air flow axially through the armature air gap. The air flow 91, 92 removes heat energy from the air core armature 78 and then transfers the heat energy to the metal motor-generator housing 83. The heat energy is conducted through the housing 83 and removed by dissipation 93 that may include radiation, conduction and or convection. The motor-generator 70 removes the heat energy from the armature and limits the temperature for reliable high duty cycle operation, while the motor-generator does not require fresh and cooler external air inlets that would preclude its use in harsh, dirty and hazardous installations.

Figure 3:
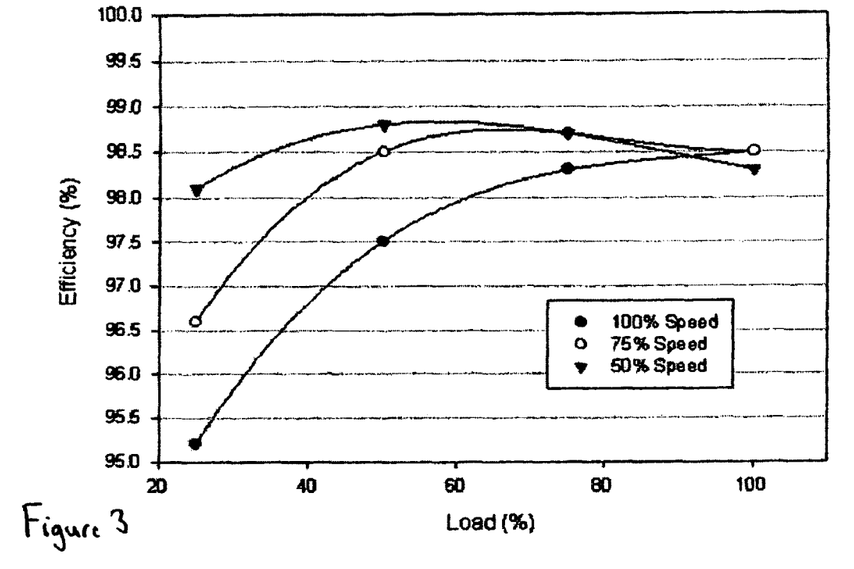
FIG. 3 is a plot of the motor efficiency versus load and speed for a brushless permanent magnet air core motor-generator in accordance with the invention.

A plot of the motor efficiency versus load and speed for a brushless permanent magnet air core motor-generator in accordance with the invention is shown in FIG. 3. The results are actual from dynamometer efficiency testing of a 40 hp 1200 rpm motor. As shown, the motor provides exceptional efficiency of 98.5% at full load and full speed. This corresponds to about 4.5% efficiency increase over the best available NEMA Premium efficiency conventional motors. The high efficiency of the motor results in part from the double rotating air core permanent magnet topology. Further, the windings are wound with wire constructed from bundled multiple individually insulated strands that are electrically insulated from each other along their length in the magnetic air gap but are electrically connected in parallel. The small conductor strand cross section precludes generation of large winding eddy current losses and multiple strands in parallel reduce the resistive losses. As a result, minimal armature heat loss generation is created, allowing the air cooling to be sufficient through totally enclosed polloidal flow.

Figure 4:
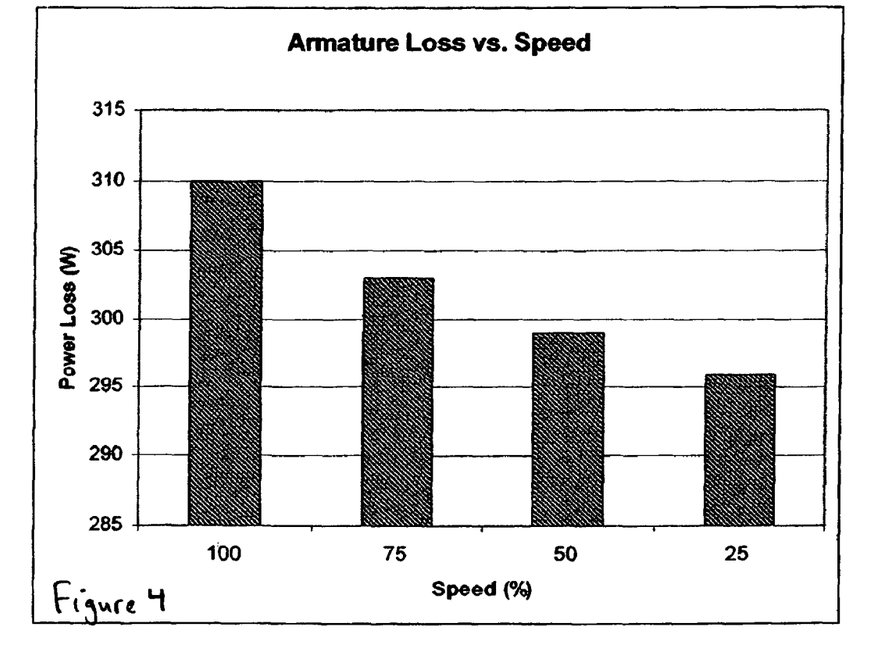
FIG. 4 is a chart of the total armature loss versus speed of a brushless permanent magnet air core motor-generator in accordance with the invention.

A chart of the total armature loss versus speed of a brushless permanent magnet air core motor-generator in accordance with the invention is shown in FIG. 4. Again, the 40 hp (29,828 W) 1200 rpm motor performance is illustrated. The total armature loss is the sum of the resistive loss in the windings and the eddy current losses. At full load, these losses total only 310 W for a total electrical efficiency of 98.96%.

The other losses in the motor result from the bearing drag and aerodynamic drag, which total slightly over 0.4%. At reduced speeds, the resistive losses stay equivalent, however the eddy current losses reduce with the square of the reduction in speed. At full speed, the eddy current losses are only 15 W. Because of the high efficiency and low eddy current construction, the armature heat to be removed is small per the motor size. In contrast, a convention 40 hp 1200 rpm motor would have to remove 1800 W or more of heat. Cooling of the motor through use of a directly driven fan or impeller will be reduced when the motor is operating at reduced speed, but heat generation in the motor at reduced speeds is also reduced, so the polloidal flow non ventilated cooling has been found to be sufficient because of the limited heat removal required. At 25% speed, less than 300 W is required to be transferred between the armature and to the inside of the container housing, which is easily done by the polloidal flow non ventilated cooling system.

Figure 5:
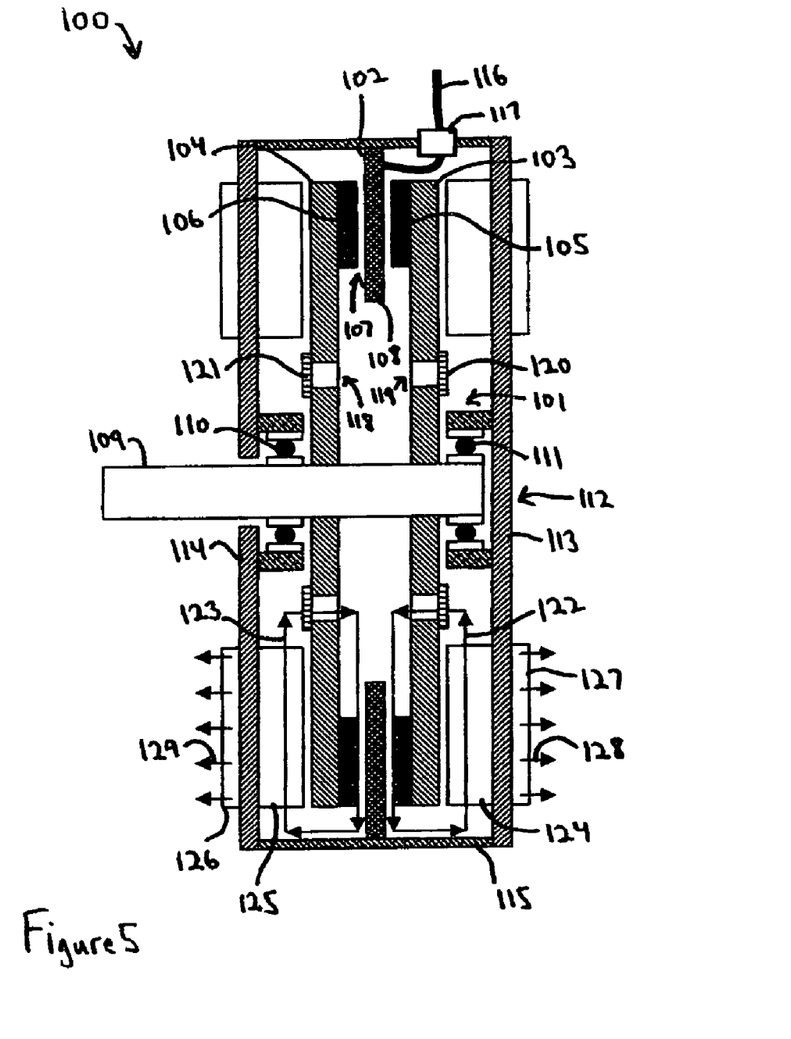
FIG. 5 is a schematic drawing of a second alternate configuration of a brushless permanent magnet air core motor-generator in accordance with the invention.

A schematic drawing of a second alternate configuration of a brushless permanent magnet air core motor-generator 100 in accordance with the invention, shown in FIG. 5, includes a rotor 101 and a stator 102. The rotor 101 is attached to a motor shaft 109 that is journalled for rotation on bearings 110 and 111 that are attached to housing end plates 113, 114 of a housing 112. The housing 112 forms a sealed container with end plates 113, 114 and outer tube 115 so that contaminants cannot enter. In most applications, there is no need of gaskets or seals between the motor shaft 109 and the housing end plate 114 to exclude contaminants in the outside atmosphere since the bearing 110 prevents free air circulation into the housing 112, especially if the bearing 110 has a dust seal. However, for application that have a special need for protection against intrusion of outside contaminants into the housing 112, a rotating seal or lip seal can be used between the shaft 109 and the housing end plate 114.

The rotor 101 is constructed from two spaced-apart steel disc rotor portions 103, 104 that are attached to the central shaft 109. A circumferential array of axially polarized, alternating polarity permanent magnets 105, 106 is attached to each rotor portion 103, 104. The magnet arrays 105, 106 drive magnetic flux back and forth across an armature air gap 107 formed between the magnet arrays. Located within the armature air gap 107 is a stator air core armature 108, structurally coupled to the motor housing 112, comprising windings that generate electromagnetic torque between the rotor 101 and stator 102 when electrically energized by electrical power delivered from a power line 116 through the housing 112 using a sealed connector or pass-through 117.

To sufficiently cool the armature 108 to prevent excessive heat build up inside the housing 112 and allow continuous operation, heat must be transferred from the armature 108 to the housing 112. Air flow inducers driven by rotation of the shaft 109 or rotor 101 are provided to induce a flow or air in a polloidal air flow 122, 123 inside the sealed container 112. One simple type of air flow inducer is holes 118, 119 in the rotor discs 103, 104 and fan members 120, 121 attached to the rotor portions 103, 104 drive the air in polloidal paths 122, 123, picking up heat from the armature 108 and transferring it to the inside of the housing 112. The heat conducts through the housing 112 and is radiated, convected and/or conducted away from the exterior of the housing 112. Heat absorbing appendages such as internal heat fins 124, 125 can be provided to increase the heat absorption from the polloidal air flows 122, 123 to the housing 112. These heat fins 124, 125 reduce the operating temperature of the air core armature 108, and increase efficiency by maintaining even lower winding resistance during operation. Further, heat dissipating appendages such as external heat fins 126, 127 can also be provided to improve the heat dissipation from the container 112. Heat flux 128, 129 dissipates the heat originally generated by the armature 108 even though there is a low thermal conductivity between the armature 108 and the container 112.

Figure 6:
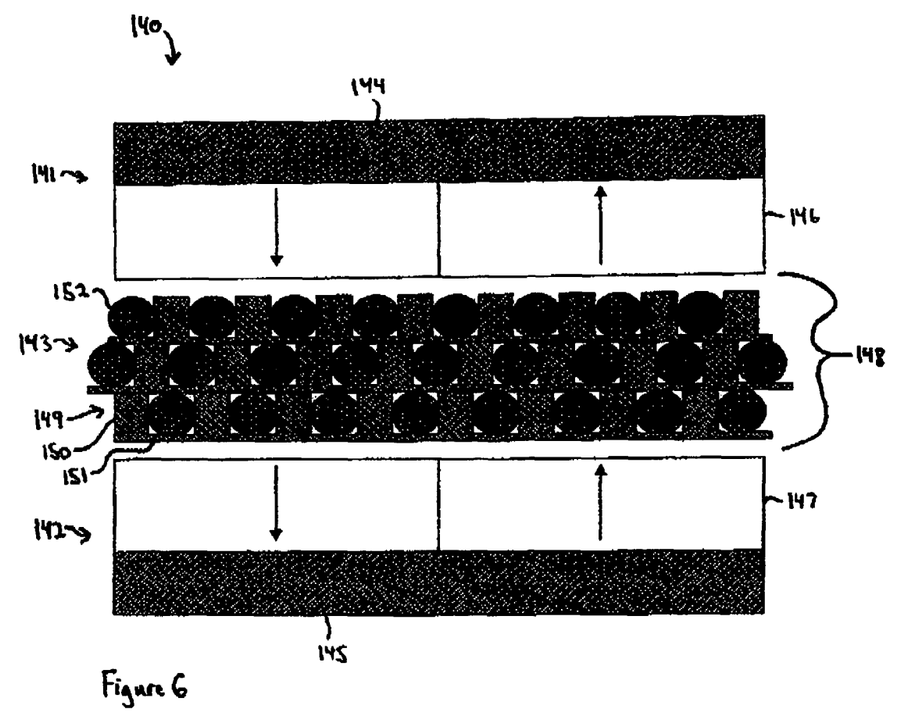
FIG. 6 is a schematic drawing of motor-generator section showing an air core armature construction of a brushless permanent magnet air core motor-generator in accordance with the invention.
Figure 7:
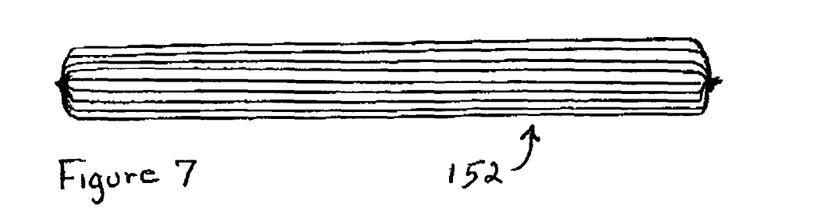
FIG. 7 is a schematic diagram of a windings wire shown in FIG. 6 made from bundled multiple individually insulated strands that are insulated from each other along their lengths and are electrically connected in parallel.

To minimize the armature power loss and the amount of heat to be removed for maintaining a lower armature operating temperature, it is preferred to utilize a low loss armature construction. A schematic drawing of a motor-generator section showing an air core armature construction of a brushless permanent magnet air core motor-generator in accordance with the invention is shown in FIG. 6. The motor-generator 140 has two rotor portions 141, 142 that are located on opposite sides of an enclosed air core armature 143. The rotor sections comprise steel portions 144, 145 that conduct magnetic flux circumferentially and attached alternating polarity magnets 146, 147 that drive magnetic flux back and forth through the stator 143, as in FIGS. 1, 2 and 5. To enable sufficient cooling with polloidal enclosed cooling, the eddy current losses are additionally preferably minimized in the windings by using wire comprised of bundled multiple individually insulated conductors that are insulated from each other in the armature air gap 148. The conductors are electrically in parallel in a given wire but are electrically insulated between each other along their lengths. This construction reduces the cross-sectional area of each individual wire strand in the bundle and therefore reduces the magnetically induced eddy current losses in the windings, so the total heat generated by eddy current heating is reduced. With less heat being generated in the windings, there is a reduced rate of heat transfer needed in the polloidal internal air flow to maintain low armature temperatures. Strands can be round, rectangular or ribbon so long as they preferably present a reduced cross sectional area to the magnetic flux traversing back and forth across the magnetic air gap 148. The windings 152 are flexible because of the multiple strand construction. One preferred construction for the air core armature uses non-magnetic plastic or non electrically conductive forms 149 to hold the windings 152 in place. The forms 149 can be constructed with a thin backing portion 151 and raised rib portions 150 attached to the backing portion 151 to form channels that hold the windings 152. Multiple forms 149 can be assembled together to form multiple phases of the air core armature 143.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. A non-ventilated motor-generator for converting between electrical and rotary mechanical energy comprising:
   a rotor enclosed inside a metal motor-generator housing and supported on a bearing system to rotate about an axis of rotation;
   said rotor is constructed of two spaced apart rotor sections with circumferential arrays of permanent magnets that drive magnetic flux back and forth across an armature air gap;
   an air core armature located in said armature air gap comprising windings that are held together in a substantially non-magnetic structure that is structurally coupled to said motor housing; wherein, said armature air gap is a space between said permanent magnets and said armature winding;

said air core armature having a thickness that is less than said armature air gap and said air core armature is located within said armature air gap such that two physical air gaps are created, with one on each side of said air core armature;

one or more air flow passages through said rotor and around the inside surfaces of said motor-generator housing, and air flow inducers that induce flow of air in a polloidal loop through said passages and around said inside surfaces of said motor-generator housing when said rotor rotates;

air flow in said polloidal loop includes a portion that passes through said armature air gap and a portion that is in contact with the inside of said motor-generator housing such that said air flow removes heat energy from said air core armature and transfers said heat energy to the inside of said motor-generator housing, wherein said heat energy is dissipated from said motor-generator housing.

2. A non-ventilated motor-generator as described in claim 1 wherein:

said air flow inside said motor-generator flows in two polloidal loops.

3. A non-ventilated motor-generator as described in claim 1 wherein:

said air flow is established by an impeller coupled with said rotor such that rotation of said rotor causes air to flow in said polloidal loop.

4. A non-ventilated motor-generator as described in claim 3 wherein:

two sets of impellers are coupled to said rotor such that sufficient air flow cooling of said air core armature is established by rotation of said rotor in either rotational direction.

5. A non-ventilated motor-generator as described in claim 1 wherein:

said armature includes multiple phase windings that are wound with wire constructed from bundled multiple individually insulated strands that are electrically insulated from each other along their length in said armature air gap and said multiple individually insulated strands in said bundles are electrically connected in parallel.

6. A non-ventilated motor-generator as described in claim 1 wherein:

heat absorbing appendages are attached to the inside of said motor-generator housing to increase the heat removal from said air flow.

7. A non-ventilated motor-generator as described in claim 1 wherein:

heat dissipating appendages are attached to the outside of said motor-generator housing to increase the heat dissipation from said motor-generator housing.

8. A non-ventilated motor-generator as described in claim 1 wherein:

said permanent magnets utilize radial magnetizations and said air flow through said armature air gap is in the axial direction.

9. A non-ventilated motor-generator as described in claim 1 wherein:

said permanent magnets utilize axial magnetizations and said air flow through said armature air gap is in the radial direction.

10. A method for cooling a motor-generator enclosed inside a housing, comprising:

rotating a rotor about an axis of rotation inside a motor housing, wherein said rotor is constructed of two spaced apart rotor sections with circumferential arrays of permanent magnets that drive magnetic flux back and forth across an armature air gap;

flowing electric current in an air core armature located in said armature air gap comprising windings that are held together in a substantially non-magnetic structure that is structurally coupled to said motor-generator housing; wherein, said armature air gap is a space between said said permanent magnets and said armature winding;

causing air to flow in a polloidal loop inside said motor-generator that includes flow through said armature air gap and flow in contact with thermally conductive portions of said motor-generator housing;

removing heat energy from said air core armature by air flow through said armature air gap;

transferring said heat energy from said air flow to said motor housing by flow in contact with the inside of said motor-generator housing;

conducting said heat energy through said motor-generator housing;

dissipating said heat energy from the outside of said motor-generator housing.

11. A method for cooling a motor-generator as described in claim 10, wherein:

said air flow inside said motor-generator flows in two polloidal loops.

12. A method for cooling a motor-generator as described in claim 10, wherein:

said air flow is established by an impeller coupled with said rotor such that rotation of said rotor causes air to flow in said polloidal loop.

13. A method for cooling a motor-generator as described in claim 12, wherein:

two sets of impellers are coupled to said rotor such that sufficient air flow cooling of said air core armature is established by rotation of said rotor in either rotational direction.

14. A method for cooling a motor-generator as described in claim 10, wherein:

said armature includes multiple phase windings that are wound with wire constructed from bundled multiple individually insulated strands that are electrically insulated from each other along their length in said armature air gap and said multiple individually insulated strands in said bundles are electrically connected in parallel.

15. A method for cooling a motor-generator as described in claim 10, wherein:

heat is absorbed from said air flow by heat absorbing appendages attached to the inside of said motor-generator housing to increase the heat removal from said air flow.

16. A method for cooling a motor-generator as described in claim 10, wherein:

heat is dissipated from said housing through heat dissipating appendages on the outside of said motor-generator housing to increase the heat dissipation from said motor-generator housing.

17. A method for cooling a motor-generator as described in claim 10, wherein:

said permanent magnets utilize radial magnetizations and said air flow through said armature air gap is in the axial direction.

18. A method for cooling a motor-generator as described in claim 10, wherein:

said permanent magnets utilize axial magnetizations and said air flow through said armature air gap is in the radial direction.

19. A non-ventilated motor-generator for converting between electrical and rotary mechanical energy comprising:
- a rotor that is supported to rotate about an axis of rotation inside a metal motor-generator housing by a bearing system;
- said rotor is constructed of two spaced apart rotor sections with circumferential arrays of permanent magnets that drive magnetic flux back and forth across an armature air gap formed;
- an air core armature located in said armature air gap comprising windings that are held together in a substantially non-magnetic structure that is structurally coupled to said motor housing; wherein, said armature air gap is a space between said said permanent magnets and said armature winding;
- said windings of said armature are wound with wire constructed from bundled multiple individually insulated strands that are electrically insulated from each other along their length in said armature air gap but are electrically connected in parallel;
- said air core armature having a thickness that is less than said armature air gap and said air core armature is located within said armature air gap such that two physical air gaps are created, with one on each side of said air core armature;
- said rotor further comprising air flow passages in at least one of said rotor sections and air is caused to flow through said passages and in a polloidal loop within the inside of said motor-generator housing;
- air flow in said polloidal loop includes a portion that passes through said armature air gap and a portion that is in contact with the inside of said motor-generator housing, whereby said air flow removes heat energy from said air core armature and transfers said heat energy to the inside of said motor-generator housing through which said heat is conducted to the outside surface of said housing and is dissipated from said motor-generator housing.

20. A non-ventilated motor-generator as described in claim 19 wherein:
- said permanent magnets utilize axial magnetizations and said air flow through said armature air gap is in the radial direction.

* * * * *